April 9, 1935.                L. BEEH                 1,996,947
                          ELECTRIC GENERATOR
                         Filed Dec. 23, 1933
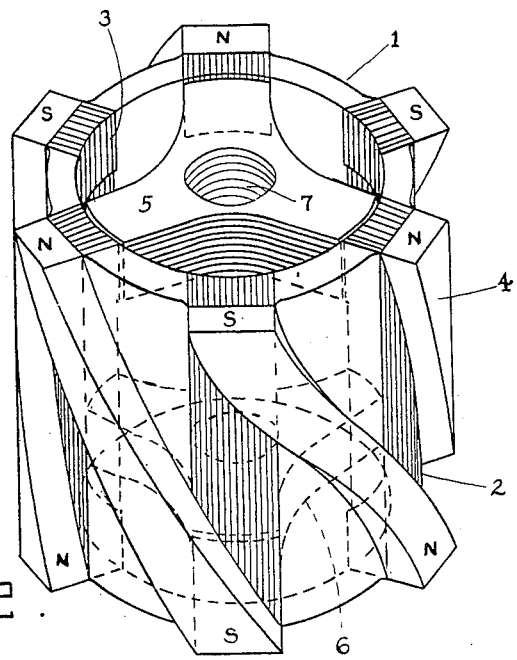
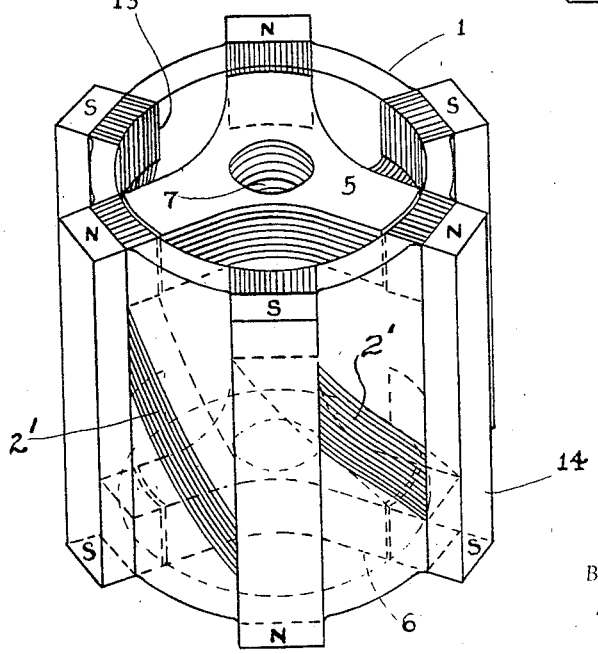
INVENTOR.
Louis Beeh
BY
ATTORNEY Patented Apr. 9, 1935

1,996,947

UNITED STATES PATENT OFFICE 1,996,947

ELECTRIC GENERATOR

Louis Bech, Longmeadow, Mass., assignor to United American Bosch Corporation, Springfield, Mass., a corporation of New York Application December 23, 1933, Serial No. 703,772

16 Claims. (Cl. 171—252)

This invention relates to improvements in electric generators and particularly to the construction of the magnet structure thereof and the flux distributor associated therewith.

An object of the invention is to provide a generator in the form of a magneto having a compact arrangement of magnets and polepieces for a magneto particularly of the so-called timer type, such as I have described in my Patent No. 1,944,590, issued January 23, 1934, for Ignition magnetos. That patent discloses a magneto with the drive shaft at one end, a circuit breaker and high tension distributor at the other and an intermediate housing or member which surrounds the generating coil and which carries the magnets and polepieces which supply the magnetic flux to energize said coil, the flux being directed by rotor members on the shaft at both ends of the coil. In the present invention I utilize a housing of such design that the magnets and polepieces can be very advantageously disposed in the magneto and controlled so that a large output of electric energy from the generating coil can be obtained.

The nature of the invention is fully set forth in the ensuing description and the novel features are pointed out in the appended claims. The disclosure, however, is explanatory only and changes in detail may be made without departing from the principle of the invention.

On the drawing:

Fig. 1 shows in perspective one embodiment of my invention; and

Fig. 2 shows a modification thereof.

In Fig. 1 the housing 1 of non-magnetic material as aluminum is hollow and cylindrical. Cast in the wall thereof are laminated members 2 of magnetic material as steel which extend from end to end of the housing and form polepieces with equally spaced faces 3 at opposite ends on the inside thereof. Each magnet 4 is secured in any suitable way on the exterior of the housing 1 and extends obliquely into contact with the upper end of one member 2 and the lower end of an adjacent member 2, each member connecting like poles of two magnets. The laminated steel rotor members 5 and 6 cooperate with the pole faces 3 in the upper and lower circles respectively, and the equally-spaced radial arms of the two are displaced from each other by the angle between adjacent polepieces.

In Fig. 2 the housing 1 carries laminated members 2′ like those of Fig. 1 except the faces 13 of the pole shoes are connected by oblique portions extending from end to end of the housing that is from the upper end of one straight magnet 14 to the lower end of the adjacent magnet, each magnet then joining the overlying pole shoes, of opposite polarity, at the two ends of the housing. The rotor members 5 and 6 are the same as in Fig. 1 except the radial arms of one overlie the others.

In both Figs. 1 and 2 the polepieces around each end of the housing alternate in polarity serially, and in timer types of magnetos the number of magnets 4 and 14 will vary according to the number of cylinders of the engine to be ignited, there being six as shown for a six-cylinder four cycle engine. Furthermore, each rotor member 5 or 6 has half as many radial arms as there are pole faces at each end, and has a central opening 7 for fastening therein a drive shaft of magnetic material as steel, the whole forming a flux distributer which is driven by the engine through suitable gearing. A generating coil (not shown) lies around the shaft between the rotor members, the coil being stationary as in my aforesaid application or rotatable with the shaft if desired. As the rotor members are turned by the shaft, the flux from the magnets first passes through the coil in one direction and then as the arms of the rotor members register with the next pole faces its direction through the coil is reversed. When used as a magneto, suitable interrupting and distributing mechanism (not shown) of the well known kind will be provided.

In Fig. 1, all the magnets 4 cooperate to supply magnetic flux through the shaft and therefore through the generating coil around the shaft, no matter what position the rotor members 5 and 6 may have, because the members 2 join the poles of adjacent magnets. For example in the position shown, the flux passes into the three arms of the upper rotor member 5 from three magnets having their N poles opposite those arms, and also through three alternate members 2 from the N poles of the other three magnets. Similarly the flux returns to the S poles of the magnets through the three arms of the lower rotor member 6 either directly through the registering pole shoes or thence through the other three alternate members 2.

In Fig. 2, likewise, all six magnets 14 cooperate simultaneously and there is a reversal of flux as the arms of the rotor members 5 and 6 move into registry with the next series of pole faces 13. The magnetic result is the same as in Fig. 1 except for the shorter magnets which are straight instead of oblique and the laminated members which are oblique instead of straight.

The arrangements herein described are compact and when used in magnetos give a comparatively large ignition current and/or high ignition voltage, particularly when magnets of high coercive force and remanence are used. It will be apparent that many changes and modifications may be made in the above described invention by anyone skilled in the art without departing from the spirit and scope of the invention as defined in the following claims.

Having described the invention, what I claim is:

1. A field magnet construction comprising a hollow housing having magnetic pole members obliquely arranged with respect thereto, and permanent magnets cooperating with said members.

2. A field magnet construction comprising a hollow housing having magnetic pole members obliquely arranged with respect thereto, and permanent magnets cooperating with said members, said magnets being parallel to the axis of the housing.

3. A field magnet construction comprising a hollow housing having polepieces at each end of the housing with faces on the interior thereof, and permanent magnets on the exterior of the housing parallel to the axis thereof and cooperating with said polepieces, and a rotor member arranged at each end of the housing and having arms in overlying position.

4. In a field magnet construction, a hollow housing having polepieces therein, and obliquely arranged permanent magnets cooperating with said polepieces.

5. In a field magnet construction, a hollow housing having polepieces therein, and obliquely arranged permanent magnets cooperating with said polepieces, said magnets being on the exterior of the housing.

6. In a field magnet construction, a hollow housing having polepieces supported thereby, and obliquely arranged permanent magnets cooperating with said polepieces, said magnets extending from end to end of the housing.

7. In a field magnet construction, a hollow housing having polepieces supported thereby, and obliquely arranged permanent magnets cooperating with said polepieces, said magnets being on the exterior of the housing and extending from one end to the other thereof.

8. In a field magnet construction a hollow housing having magnetic members therein extending from end to end and having polar faces at the inside of the housing at the ends thereof, and permanent magnets on the exterior of the housing, each of said magnets bridging the space between the end of one member and the opposite end of the adjacent member.

9. A field magnet construction comprising magnetic members extending substantially in the same direction, and permanent magnets uniting the end of one member with the opposite end of another member.

10. A field magnet construction comprising magnetic members, and permanent magnets uniting the end of each member with the opposite end of an adjacent member, the pole pieces of said magnets engaging each member being of like polarity.

11. A field magnet construction comprising magnetic members, and permanent magnets uniting the end of one member with the opposite end of another member, the pole pieces of said magnets engaging the same member being of like polarity, said magnets being arranged so that said members alternate in polarity serially.

12. In an electric generator, a hollow housing having polepieces supported thereby and obliquely arranged permanent magnets cooperating with said polepieces and arranged on the exterior of the housing extending from one end to the other thereof, and rotor members at the ends of the housing, each having arms which register with the polepieces.

13. In an electric generator, magnetic members, permanent magnets uniting the end of one member with the opposite end of another member, and a flux distributor for the magnets.

14. In an electric generator, magnetic members, permanent magnets uniting the end of one member with the opposite end of another member, and a flux distributor for the magnets, the magnetic members, magnets and the flux distributor being constructed and arranged so that all magnets are magnetically effective simultaneously.

15. In an electric generator, a hollow cylindrical housing comprising a casting of nonmagnetic material having laminated polepieces integral with said casting and extending longitudinally thereof, and permanent magnets on the exterior of said housing connecting opposite ends of adjacent polepieces.

16. In an electric generator, a hollow cylindrical housing comprising a casting of nonmagnetic material having laminated polepieces integral with said casting and extending longitudinally thereof, permanent magnets on the exterior of said housing connecting opposite ends of adjacent polepieces, and inductor members at each end of the housing having offset arms.

LOUIS BEEH.